(12) United States Patent
Wakamatsu

(10) Patent No.: US 10,076,812 B2
(45) Date of Patent: Sep. 18, 2018

(54) MULTI-PLATE-STACK-TYPE HEAT EXCHANGER, AND CORE PLATE THEREFOR

(71) Applicant: MAHLE FILTER SYSTEMS JAPAN CORPORATION, Tokyo (JP)

(72) Inventor: Shozo Wakamatsu, Fujimino (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 253 days.

(21) Appl. No.: 14/649,326

(22) PCT Filed: Nov. 11, 2013

(86) PCT No.: PCT/JP2013/080379
§ 371 (c)(1),
(2) Date: Jun. 3, 2015

(87) PCT Pub. No.: WO2014/091850
PCT Pub. Date: Jun. 19, 2014

(65) Prior Publication Data
US 2016/0214215 A1    Jul. 28, 2016

(30) Foreign Application Priority Data
Dec. 12, 2012    (JP) ................. 2012-270913

(51) Int. Cl.
*F28F 3/00*    (2006.01)
*B23P 15/26*    (2006.01)
(Continued)

(52) U.S. Cl.
CPC .............. *B23P 15/26* (2013.01); *B23K 1/008* (2013.01); *B23K 1/0012* (2013.01); *B23K 1/19* (2013.01);
(Continued)

(58) Field of Classification Search
CPC .... F28F 2275/045; F28F 2275/04; F28F 3/10; F28F 3/08; F28F 3/086; F28D 9/0037;
(Continued)

(56) References Cited

U.S. PATENT DOCUMENTS 2,814,469 A    11/1957    Hytte
3,117,624 A *  1/1964    Wennerberg ............ F28D 9/005
                                                             165/139
(Continued)

FOREIGN PATENT DOCUMENTS

EP    2 267 391 A2    12/2010
EP    2267390 A2 *    12/2010    ............. F28D 9/005
(Continued)

OTHER PUBLICATIONS

EP2267390A2 amchine translation.*
(Continued)

*Primary Examiner* — Etsub Berhanu
*Assistant Examiner* — Gordon Jones
(74) *Attorney, Agent, or Firm* — Foley & Lardner LLP

(57) ABSTRACT

By stacking a plurality of core plates (15) each of which has, around a peripheral edge of a base portion (30), an outer peripheral tapered portion (31) that expands outward, and joining the outer peripheral tapered portions (31) of adjacent core plates by brazing, a heat exchanging fluid passage (17, 18) is defined between the base portions (30) of the adjacent core plates. Outer and inner peripheral surfaces of the outer peripheral tapered portion are shaped to extend straightly in cross section. A leading end part of the outer peripheral tapered portion (31) is formed at the inner peripheral surface thereof with a recess (33) that is depressed toward the outer peripheral surface.

2 Claims, 5 Drawing Sheets

(51) Int. Cl.
 B23K 1/00     (2006.01)
 F28D 9/00     (2006.01)
 B23K 1/008    (2006.01)
 B23K 1/19     (2006.01)
 F28F 3/08     (2006.01)
 F28D 21/00    (2006.01)
 B23K 101/14   (2006.01)
 B23K 103/10   (2006.01)

(52) U.S. Cl.
 CPC ......... *F28D 9/0037* (2013.01); *F28D 9/0043* (2013.01); *F28F 3/08* (2013.01); *B23K 2201/14* (2013.01); *B23K 2203/10* (2013.01); *F28D 2021/0089* (2013.01); *F28F 2275/045* (2013.01)

(58) Field of Classification Search
 CPC .. F28D 9/0043; B23K 2201/14; B23K 1/0012
 See application file for complete search history.

(56) References Cited

U.S. PATENT DOCUMENTS

| | | | | |
|---|---|---|---|---|
| 4,893,673 | A * | 1/1990 | Rosman | F28D 9/0075 165/166 |
| 5,369,883 | A * | 12/1994 | So | F28D 9/0043 29/890.039 |
| 6,182,746 | B1 | 2/2001 | Wiese | |
| 2004/0112579 | A1 * | 6/2004 | Strahle | F28D 9/005 165/166 |
| 2005/0092474 | A1 * | 5/2005 | Seidel | B23K 31/12 165/166 |
| 2008/0030023 | A1 * | 2/2008 | Kurata | B21C 37/154 285/123.1 |
| 2009/0032231 | A1 * | 2/2009 | Komoda | F28D 9/005 165/166 |

FOREIGN PATENT DOCUMENTS

| | | | |
|---|---|---|---|
| JP | 2-89991 | A | 3/1990 |
| JP | H0289991 | A * | 3/1990 |
| JP | 2-306097 | A | 12/1990 |
| JP | 5-157481 | A | 6/1993 |
| JP | 8-303983 | A | 11/1996 |
| JP | 9-277038 | A | 10/1997 |
| JP | 10-185462 | A | 7/1998 |
| JP | 2000-180077 | A | 6/2000 |
| JP | 2008-309378 | A | 12/2008 |

OTHER PUBLICATIONS

Extended European Search Report, Sep. 9, 2016, 6 pages.
Japanese Office Action and partial English translation, dated Mar. 7, 2017, 5 pages.
Japanese Office Action and partial English translation, Aug. 9, 2016, 5 pages.

* cited by examiner (A)

(B)

MULTI-PLATE-STACK-TYPE HEAT EXCHANGER, AND CORE PLATE THEREFOR

TECHNICAL FIELD

The present invention relates to a multi-plate-stack-type heat exchanger that has a plurality of core plates stacked on one another and more particularly to improvement of the core plates.

BACKGROUND ART

As is described in Patent Document 1, a multi-plate-stack-type heat exchanger is used in automotive oil coolers. The heat exchanger of such type comprises a plurality of core plates that have, around peripheral edges of respective base portions thereof, outer peripheral tapered portions extending toward an outer peripheral side and are stacked on one another, and the outer peripheral tapered portions of adjacent core plates are joined to each other by brazing, so that a heat exchanging fluid passage is formed between the base portions of the adjacent core plates.

PRIOR ART DOCUMENTS

Patent Document

Patent Document 1: U.S. Pat. No. 6,182,746B1

SUMMARY OF INVENTION

Problems to be Solved by Invention

However, if the outer peripheral tapered portion of each core plate is shaped to extend straightly in cross section, upon stacking, the core plates tend to fail to show a desirable stacking thereof particularly in case where the outer peripheral tapered portions are not exactly dimensioned.

While, if the outer peripheral tapered portion of each core plate is of a flared type in which, like in the core plate described in Patent Document 1, the outer peripheral tapered portion expands gradually outward as approaching a leading end thereof, the outer peripheral tapered portion does not provide a satisfied area that extends straightly, and thus, a mutually contacted portion of adjacent core plates is reduced, which causes a fear of lowering the mechanical strength of the joined portions. Furthermore, in case where the outer peripheral tapered portion is of the flared type, the press-formability of a leading portion thereof is deteriorated. That is, when pressing or bending the leading portion to expand the same outward, the core plate tends to show an individual difference in expansion characteristic due to a spring back (viz., restoring force) of the material itself of each core plate. Accordingly, the core plates used are of a mixed type that contains core plates showing a larger expansion of the leading portions and core plates showing a smaller expansion of the leading portions, and thus, the quality of the product is lowered.

The present invention is provided by taking the above-mentioned drawbacks into consideration and aims to provide a new multi-plate-stack-type heat exchanger and a new core plate therefor, which show excellence in assemblability as well as improvement in quality of the assembled product.

Means For Solving The Problems

The present invention relates to a multi-plate-stack-type heat exchanger and a core plate therefor, the multi-plate-stack-type heat exchanger comprising a plurality of core plates that are stacked on one another each having, around a peripheral edge of a base portion thereof, an outer peripheral tapered portion that extends toward an outer peripheral side, the outer peripheral tapered portions of adjacent core plates being joined to each other by brazing, so that a heat exchanging fluid passage is formed between the base portions of the adjacent core plates.

The outer peripheral tapered portion has outer and inner peripheral surfaces that are shaped to extend straightly in cross section. The inner peripheral surface of a leading end of the outer peripheral tapered portion is formed with a recess that is depressed toward the outer peripheral surface.

Since, as is mentioned hereinabove, the inner peripheral surface of the leading end of the outer peripheral tapered portion is formed with the recess, upon stacking the core plates in a stacking direction, the core plates can be neatly stacked on one another, and thus, assemblability is improved and the quality of the assembled product is increased.

Furthermore, since the recess is formed at only the inner peripheral surface of the outer peripheral tapered portion and the outer peripheral surface is shaped to extend straightly in cross section, the press-forming of the core plate can be made with ease as compared with the press-forming of the flared type core plate. Furthermore, since the individual difference is not easily produced, the quality is improved. Furthermore, since expansion of the leading end parts of the core plates upon stacking of the same is suppressed, undesired strength reduction can be avoided.

Preferably, respective recesses of adjacent core plates are placed apart from each other in an inclination direction of the outer peripheral tapered portion. With this arrangement, there can be assuredly provided an area where the respective inner and outer peripheral surfaces of adjacent core plates are directly joined, and thus, satisfied strength can be obtained.

Advantages Of The Invention

As is mentioned hereinabove, in accordance with the present invention, by improving core plates for the multi-plate-stack-type heat exchanger, the assemblability of the heat exchanger is improved and the quality of the assembled product is increased.

In the following, the present invention will be described with the aid of illustrated embodiments. First, with reference to FIGS. 1 to 4, an automotive oil cooler that is a multiplate-stack-type heat exchanger of a first embodiment of the present invention will be described.

The oil cooler 10 comprises a core unit 11 that performs heat exchange between oil and cooling water which are fluids used for heat exchanging, a relatively thick top plate 12 that is mounted on an upper surface of the core unit 11, and bottom plates 13 and 14 that are connected to a lower surface of the core unit 11.

Figure 1:
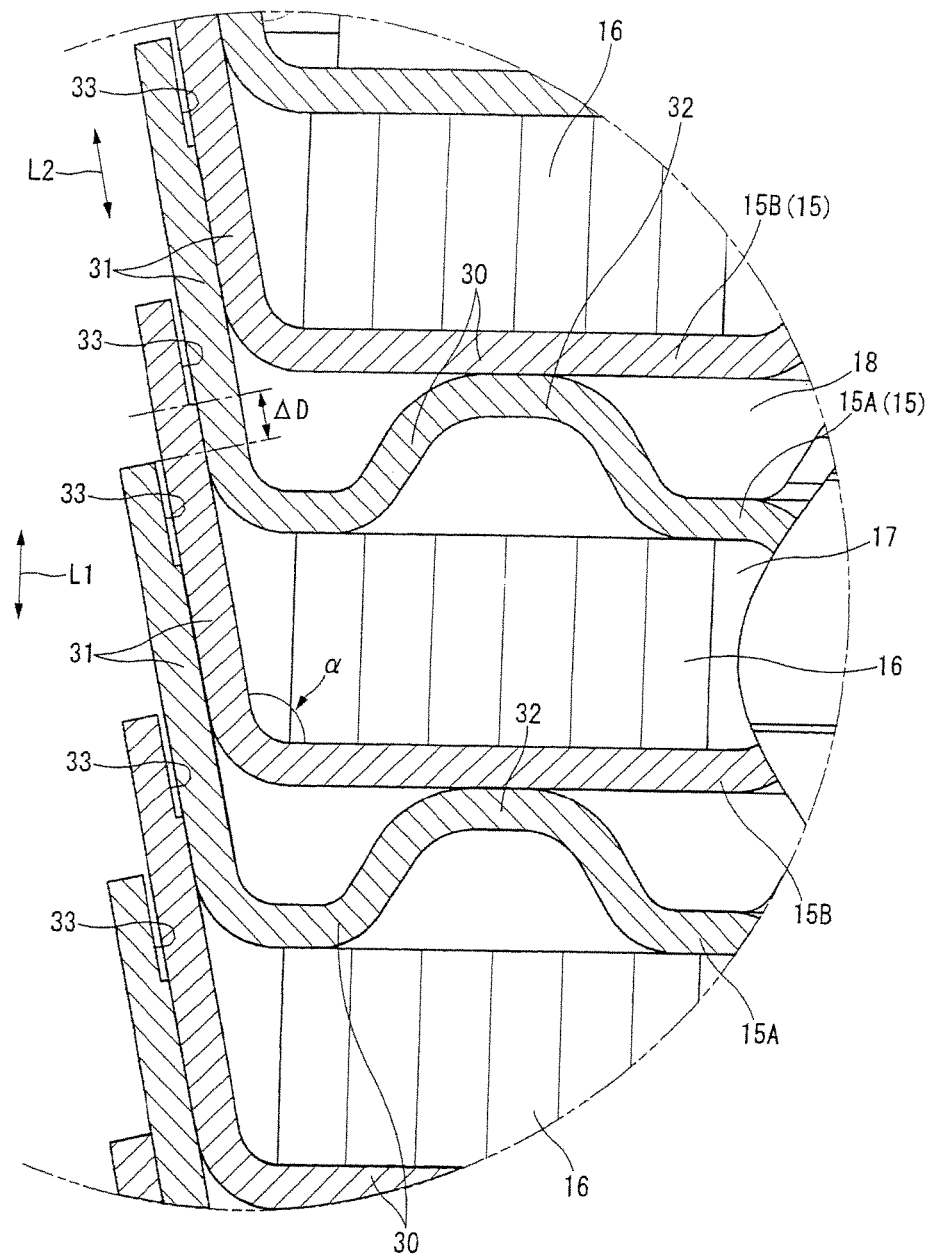
FIG. 1 is a sectional view showing an essential portion of an oil cooler (viz., multi-plate-stack-type heat exchanger) that is a first embodiment of the present invention.
Figure 2:
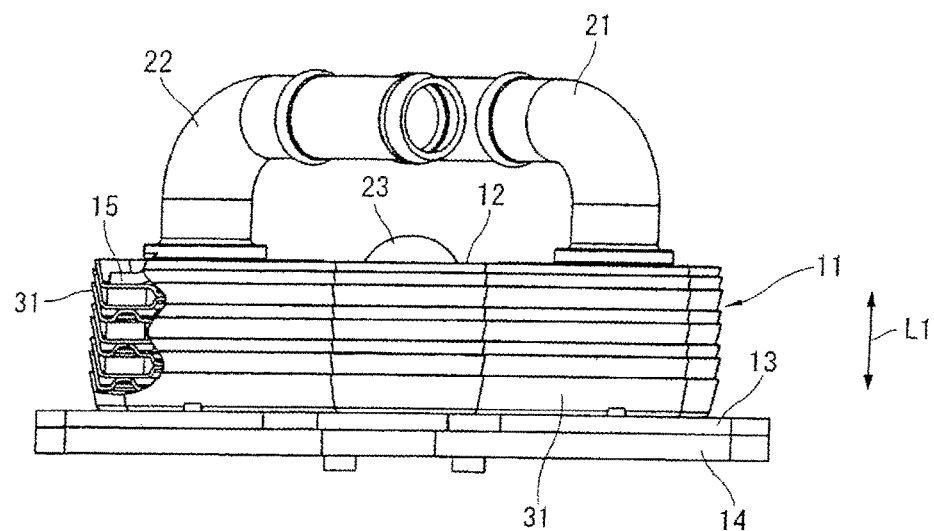
FIG. 2 is a partially sectioned side view of the oil cooler of the first embodiment.
Figure 3:
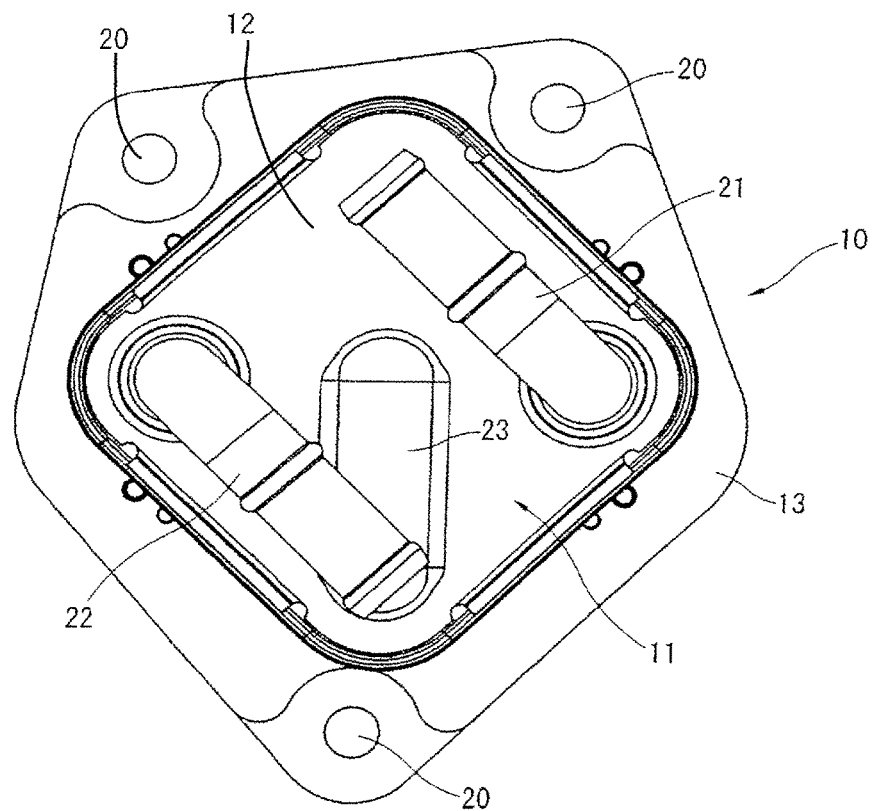
FIG. 3 is a plan view of the oil cooler of the first embodiment.
Figure 4:
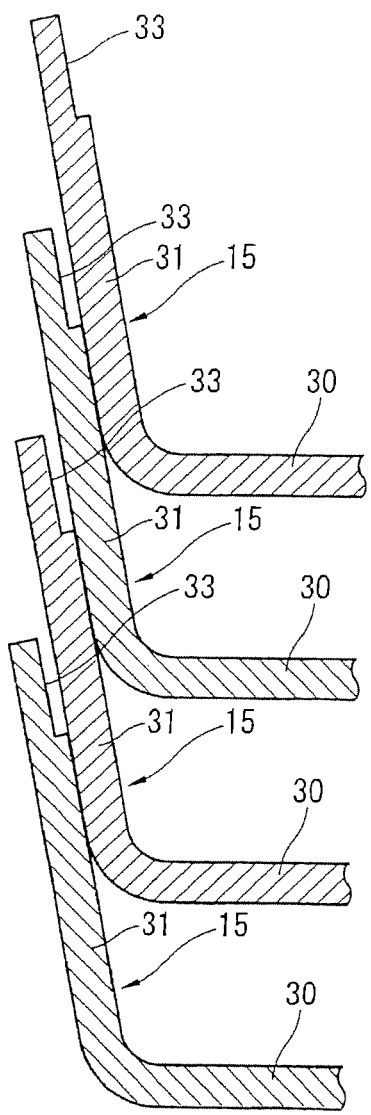
FIG. 4 provides illustrations showing a condition in which core plates of the first embodiment are stacked, the illustration denoted by (A) shows a condition before brazing and the illustration denoted by (B) shows a condition after brazing.
Figure 4:
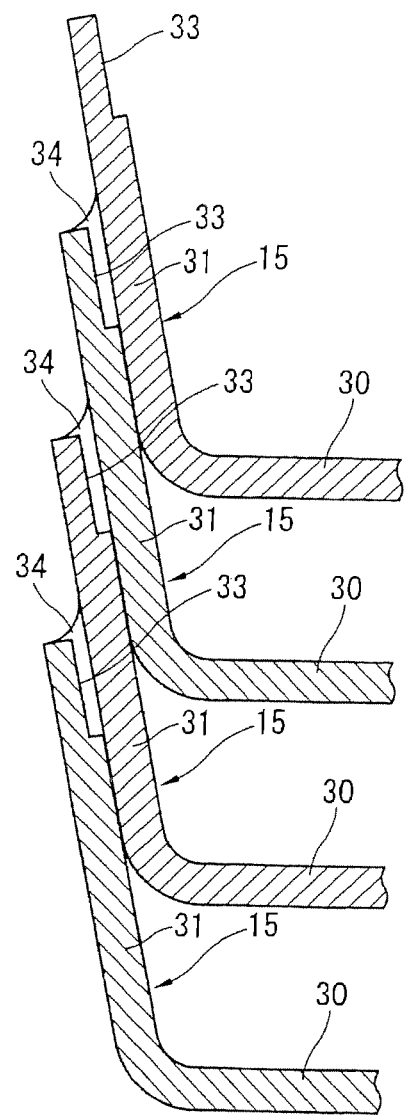

The core unit 11 is constructed to have a plurality of first core plates 15A (15) and a plurality of second core plates 15B (15) that are substantially identical in shape and alternately stacked on one another to alternately define between the core plates 15 oil passages 17 and cooling water passages 18 as heat change fluid passages. In the illustrated example, between a lower surface of each first core plate 15A and an upper surface of the corresponding second core plate 15B, there is defined the oil passage 17, and between a lower surface of each second core plate 15B and an upper surface of the corresponding first core plate 15A, there is defined the cooling water passage 18. In each of the oil passages 17, there is provided a generally rectangular fin plate 16. It is to be noted that the fin plate 16 in FIG. 1 is illustrated schematically. But, actually, the fin plate 16 has a so-called fin shape in its entirety.

Although not shown in the drawings, within the core unit 11, there are formed vertical oil passages at two locations on a diagonal line, vertical cooling water passages at two locations on the other diagonal line and a center vertical oil passage at a center location. These vertical passages are provided by joining boss portions formed around openings provided in one core plate to boss portions formed around openings provided in another core plate throughout entire core plates 15. The vertical passages extend in a core plate stacking direction L1 while penetrating the plurality of core plates 15. The vertical oil passages and the center vertical oil passage are connected to a plurality of oil passages 17, and the vertical cooling water passages are connected to a plurality of cooling water passages 18.

The first and second core plates 15A and 15B are each produced by applying a press-forming to a thin base material of aluminum alloy. Each of them has a generally rectangular shape as a whole. Each core plate 15 is constructed to have a thinner base portion 30 and an outer peripheral tapered portion 31 that extends along and around a peripheral edge of the base portion 30 while expanding outward. Under a condition where the core plates 15 are stacked on one another, the outer peripheral tapered portions 31 of adjacent two core plates 15 are in contact with each other.

The base portion 30 of each first core plate 15A is formed with a plurality of embosses 32 that are joined with an adjacent second core plate 15B to obtain satisfied strength and rigidity for spaces of the fluid passages 17 and 18.

On the top of the core unit 11, there is mounted the top plate 12. The top plate 12 is formed with both a cooling water introduction pipe 21 that is connected to one of the paired vertical cooling water passages and a cooling water discharge pipe 22 that is connected to the other of the paired vertical cooling water passages. Furthermore, the top plate 12 is formed with a swelled part 23 that extends along one diagonal line of the top plate 12, and due to provision of the swelled part 23, a connecting passage (not shown) that connects one of the vertical oil passages of the core unit 11 to an upper end of the center vertical oil passage is provided.

At a lower portion of the core unit 11, there are stacked the bottom plates 13 and 14 that are relatively thick and have a satisfied rigidity. Although not shown in the drawings, these bottom plates 13 and 14 are provided with both an oil inlet that connects to one of the vertical oil passages of the core unit 11 and an oil outlet that connects to the center vertical oil passage. Due to usage of bolts operatively engaged with bolt openings 20 (see FIG. 3), the bottom plates are tightly fixed to a cylinder block or the like through a suitable gasket while assuring a liquid-tight sealing.

Accordingly, in operation, the high temperature oil after lubricating various portions of an internal combustion engine is led into the oil passages 17 of the core unit 11 from the oil inlet of the bottom plates 13 and 14, and forced to exchange the heat with the cooling water flowing in adjacent cooling water passages 18, and then, the oil thus cooled is led into the center vertical oil passage through the connecting passage of the swelled part 23 and finally returned to the internal combustion engine from the oil outlet of the bottom plates 13 and 14. If desired, the oil flow direction may be reserved. That is, in this reversed case, the high temperature oil is led into the center vertical oil passage and, after the high temperature oil establishes the heat exchange in the core unit 11, the oil thus cooled is returned to the internal combustion engine from the vertical oil passage that is placed at the lowermost position. The cooling water is delivered from the cooling water introduction pipe 21 to the cooling water passages 18 through the vertical cooling water passages and finally led to the cooling water discharge pipe 22.

The above-mentioned core plates 15, the fin plates 16, the top plate 12 and the bottom plates 13 and 14 are joined to one another by brazing thereby to constitute an integrated unit. More specifically, each of these parts is made from a so-called clad material that is produced by applying a brazing material layer to a surface of a base material of aluminum alloy, and after the parts are temporarily assembled at given positions, the temporarily assembled parts are put in a furnace and heated, so that the parts are integrally brazed. It is to be noted that due to special shapes of the top plate 12 and the bottom plates 13 and 14, the core plates 15 provided at the uppermost and lowermost positions of the core unit 11 are somewhat different in construction from general core plates 15 that constitute a middle portion of the core unit 11.

In the following, the construction of the outer peripheral tapered portion 31 of the core plate 15 in the embodiment will be described. The outer peripheral tapered portion 31 is raised up from the peripheral edge of the base portion 30 at a given angle α while being inclined outwardly, and outer and inner surfaces (except the portion cut out due to provision of an after-mentioned recess 33) of the portion 31 except a curved root section connected to the peripheral edge with a suitable curvature defined therebetween are shaped to extend straightly in cross section.

The leading end part of the outer peripheral tapered portion 31 is formed at an inner surface thereof with a recess 33 that is depressed toward the outer peripheral surface. In this first embodiment, the recess 33 has such a rectangular cross section that the dimension of the recess 33 in a plate thickness direction is remarkably smaller than the dimension of the recess in a direction extending along the inclination direction L2 of the outer peripheral tapered portion 31, and the recess is opened at the leading end of the outer peripheral tapered portion 31. Accordingly, due to provision of the recess 33, the inner surface of the leading end part of the outer peripheral tapered portion 31 is partially depressed and thus, the plate thickness of the leading end part is partially reduced.

In order to prevent the recesses 33 of adjacent core plates 15 from overlapping with each other in the inclination direction L2 of the outer peripheral tapered portion 31 under a condition where the core plates 15 are stacked and assembled, in other words, in order to provide the recesses 33 of adjacent core plates 15 with a given distance (distance: ΔD) therebetween in the inclination direction L2, the dimension of the recess 33 in the inclination direction L2 is made relatively small.

As is described hereinabove, in this embodiment, at the time of stacking the core plates 15 on one another, the recess 33 provided at the inner surface of the leading end part of the outer peripheral tapered portion 31 can function to effectively prevent the inner surface of the leading end part of the outer peripheral tapered portion 31 from interfering with another core plate 15. That is, since the recess 33 can serve as an insertion assisting shape at the time of stacking the core plates 15, the assembling workability is remarkably improved and the quality of assembled product is increased.

Furthermore, since the recess 33 is provided at only the inner surface of the outer peripheral tapered portion 31 and the inner and outer surfaces of the outer peripheral tapered portion 31 except a part of the inner surface where the recess 33 is provided are shaped to extend straightly in cross section, machining and processing of the core plate are easy as compared with the flared type in which the outer peripheral tapered portion gradually expands outward when approaching its leading end. Due to the easier machining and processing, undesired individual differences are hardly produced, and thus, the quality is increased. Furthermore, due to the straight construction, the leading end part is suppressed from expanding outward at the time of stacking the core plates 15, and thus, reduction of strength is not induced.

As will be understood from FIG. 4(B), due to provision of the recess 33, a brazing material 34 enters the recess 33 during brazing, and thus, adjacent core plates 15 can be assuredly brazed and thus joining strength is increased. FIG. 4A shows a condition just before brazing of core plates 15 stacked and FIG. 4B shows a condition after brazing of the core plates stacked. Although FIG. 1 is an illustration showing no brazing material 34, actually, the brazing material 34 is received in the recess 33.

However, if the recess 33 is too long in the inclination direction L2, the distance ΔD of the part where respective inner and outer surfaces of the adjacent core plates 15 are directly joined becomes small bringing about a fear of lowering in strength. Accordingly, in the embodiment, the recesses 33 of adjacent core plates 15 are arranged apart from one another in a plate stacking direction L1. With this, between the adjacent core plates 15, there is assuredly provided the distance ΔD of the part within which the inner and outer surfaces of the adjacent core plates 15 are directly joined, and thus, satisfied strength can be obtained.

Figure 5:
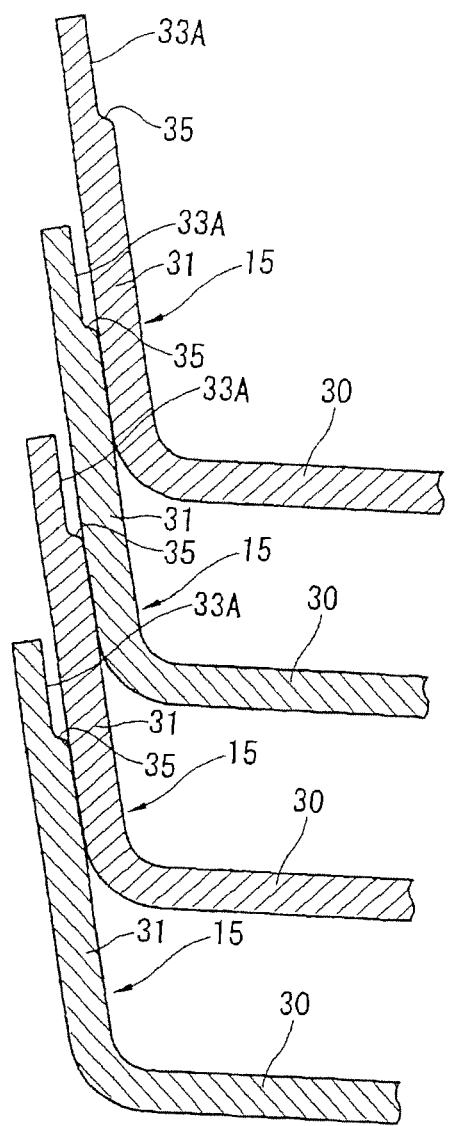
FIG. 5 is an illustration showing recesses of core plates used in a second embodiment of the present invention.
Figure 6:
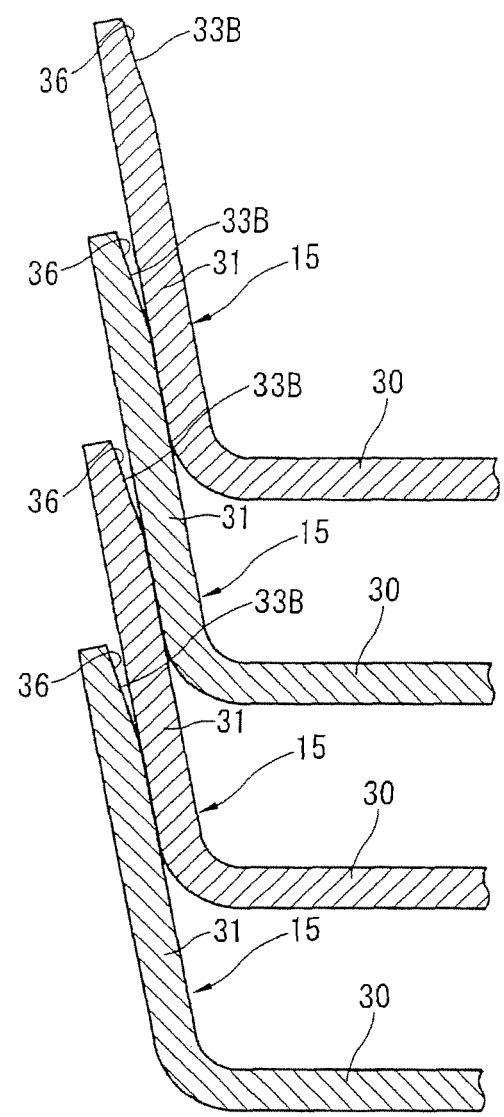
FIG. 6 is an illustration showing recesses of core plates used in a third embodiment of the present invention.

It is to be noted that the shape of the recess 33 is not limited to the shape mentioned in the embodiment. That is, the recess 33 may have the shape as shown in FIGS. 5 and 6 that show second and third embodiments. The recess 33A of the second embodiment shown in FIG. 5 has at its bottom end a corner portion 35 that has a curved surface. If desired, entire construction of the recess may have a curved surface.

In the third embodiment shown in FIG. 6, the recess 33B is so tapered as to expand as extending toward the leading end. That is, the dimension of the recess 33B in a plate thickness direction increases as approaching the leading end. In other words, due to provision of an inclined surface 36 inclined at a given angle relative to the inner surface, the recess 33B is so shaped as to reduce the thickness of the leading end part as approaching the leading end. In the recess 33B of this third embodiment, the distance to an adjacent core plate 15 increases as approaching the leading end, and thus, undesired interference between the adjacent core plates 15 can be assuredly suppressed or avoided at the time of stacking the core plates 15, and thus, the assembling workability is much more improved.

The invention claimed is:

1. A multi-plate-stack-type heat exchanger, comprising:
a plurality of core plates that are stacked on one another, each core plate having, around a peripheral edge part of a base portion thereof, an outer peripheral tapered portion inclined outward, the outer peripheral tapered portions or the peripheral edge parts of the adjacent core plates being joined to each other by brazing, so that a heat exchanging fluid passage is formed between the base portions of the adjacent core plates, wherein
each of the core plates is made from a clad material having a brazing material layer applied to a surface of a base material;
the outer peripheral tapered portion of at least one of the core plates has outer and inner peripheral surfaces having cross-sections that are shaped to extend in a straight manner;
a leading end part of the outer peripheral tapered portion is formed at the inner peripheral surface thereof with a recess that is depressed toward the outer peripheral surface;
a cross section of the recess is shaped such that a dimension thereof in a plate thickness direction is smaller than that in an inclination direction of the outer peripheral tapered portion, and
the recess is configured to receive therein brazing material of the brazing material layer,
wherein recesses of adjacent core plates are arranged apart from each other in the inclination direction of the outer peripheral tapered portion.

2. A core plate assembly for a heat exchanger, comprising:
a plurality of core plates that are stacked on one another, at least one of the plurality of core plates having, around a peripheral edge part of a base portion thereof, an outer peripheral tapered portion inclined outwardly, the outer peripheral tapered portions or the peripheral edge parts of adjacent core plates being joined to each other by brazing, so that a heat exchanging fluid passage is formed between the base portions of the adjacent core plates, wherein
at least one of the core plates comprises clad material having a brazing material layer applied to a surface of a base material;
the outer peripheral tapered portion of the at least one of the core plates has outer and inner peripheral surfaces having cross-sections that are shaped to extend in a straight manner;
a leading end part of the outer peripheral tapered portion is formed at the inner peripheral surface thereof with a recess that is depressed toward the outer peripheral surface;
a cross section of the recess is shaped such that a dimension in a plate thickness direction thereof is smaller than that in an inclination direction of the outer peripheral tapered portion, and
the recess is configured to receive therein brazing material of the brazing material layer.

* * * * *